United States Patent [19]

Israelsson

[11] Patent Number: 5,737,689
[45] Date of Patent: Apr. 7, 1998

[54] METHOD FOR PREVENTING CALLS OF BAD QUALITY FROM BEING DISCONNECTED IN A CELLULAR MOBILE RADIO SYSTEM

[75] Inventor: Per Viktor Israelsson, Täby, Sweden

[73] Assignee: Telefonaktiebolaget LM Ericsson, Stockholm, Sweden

[21] Appl. No.: 261,264

[22] Filed: Jun. 14, 1994

[51] Int. Cl.⁶ ........................... H04M 11/00
[52] U.S. Cl. ........................... 455/33.2; 379/60
[58] Field of Search ............... 455/33.1, 33.2, 455/33.3, 33.4, 54.1, 54.2, 56.1, 62, 63, 67.1, 67.3, 67.6; 379/58, 59, 60, 63; 375/346

[56] References Cited

U.S. PATENT DOCUMENTS

| | | |
|---|---|---|
| 4,475,010 | 10/1984 | Huensch et al. |
| 4,485,486 | 11/1984 | Webb et al. |
| 4,556,760 | 12/1985 | Goldman |
| 4,670,899 | 6/1987 | Brody et al. |
| 4,718,081 | 1/1988 | Brenig |
| 4,748,655 | 5/1988 | Thrower et al. |
| 4,797,947 | 1/1989 | Labedz |
| 5,119,501 | 6/1992 | Perry et al. |
| 5,175,867 | 12/1992 | Wejke et al. |
| 5,241,685 | 8/1993 | Bodin et al. ............ 455/33.2 |
| 5,241,686 | 8/1993 | Charbonnier ........... 455/56.1 |
| 5,276,907 | 1/1994 | Meidan ................... 455/56.1 |
| 5,293,641 | 3/1994 | Kallin et al. ............ 455/33.1 |
| 5,369,786 | 11/1994 | Hulsebosch ............ 455/56.1 |
| 5,392,453 | 2/1995 | Gudmundson et al. .. 455/33.2 |

OTHER PUBLICATIONS

GSM Recommendation 05.08, Radio Sub-System Link Control, version 3.7.0, pp. 1-38.

*Primary Examiner*—Andrew Faile
*Attorney, Agent, or Firm*—Burns, Doane, Swecker & Mathis, L.L.P.

[57] ABSTRACT

In a cellular mobile radio system, a handoff method allows a mobile station to be handed off from one base station to another base station when an alarm case occurs in an operator controlled manner in an attempt to save the connection. A cell border is defined where a handoff is allowed from a first base station to a second base station by comparing the radio transmissions between a mobile station and the first and second base stations. The handoff border is then moved by an offset value to form an alarm case cell border, wherein an alarm case handoff from the first base station to the second base station is allowed only when the mobile station experiences an alarm case and is in the area bounded by the handoff cell border and the alarm case handoff border.

8 Claims, 2 Drawing Sheets

METHOD FOR PREVENTING CALLS OF BAD QUALITY FROM BEING DISCONNECTED IN A CELLULAR MOBILE RADIO SYSTEM

FIELD OF THE INVENTION

The present invention relates to mobile station locating and handoff in a cellular mobile radio telephone system and more particularly to a handoff procedure to be used when a mobile station is experiencing an alarm case regarding connection survival.

BACKGROUND OF THE INVENTION

In a cellular mobile radio telephone system, a collection of cells or radio base stations each having a specified coverage area is controlled to provide duplex radio communications with a large number of mobile stations through a geographical area. The coverage areas or cells of the individual base stations overlap to allow for handoffs, when a mobile station crosses the cell border. Responsibility for mobile stations in overlapping areas is assigned based on various criteria to define, in effect, a patchwork of non-overlapping contiguous cells, typically illustrated as hexagons. The base stations are linked to a mobile switching center which in turn is linked to the public telephone system to allow the radio telephone system to function as an extension of the conventional telephone system.

For a call connection to or from a mobile station to remain uninterrupted as the mobile station travels from cell to cell, the responsibility for handling the call connection must be "handed off" from one cell to another. To accomplish such a handoff, a procedure must be provided for locating the mobile station, or tracking its position in relation to cell boundaries.

Various methods are known for locating mobile stations in a mobile radio telephone system. Two such methods of particular importance involve signal strength monitoring and path loss monitoring, respectively. Signal strength and path loss are related but distinct quantities. The signal strength is a measure of the power of a received radio frequency signal. Path loss is a measure of the decrease in power of a radio frequency signal during transit of the signal from a transmitter to a receiver. Path loss may be calculated from signal strength if the transmission power is known.

Most present day mobile radio telephone systems use signal strength to determine the location of the mobile stations. When the signal strength of a mobile station falls below a specified threshold, the mobile station is assumed to have passed beyond the borders of the currently responsible cell. As a result, the mobile station is assumed to have entered the neighboring cell that registers the highest signal strength for the mobile station. In addition to signal strength and path loss, it is necessary to consider the quality or bit error rate of a connection when deciding to perform a handoff whereby high quality corresponds to low bit error rate and vice-versa.

When the quality of the signal of a mobile station decreases to a level below a predetermined minimum level and a base station or cell with a better signal strength or path loss cannot be found, the mobile station is said to be experiencing an alarm case. In this situation, the system, i.e., the GSM system, may try to improve the quality of the connection by handing off the call to another cell which provides a channel with lower signal strength or higher path loss but having better quality. This type of handoff, though often improving the quality for the handed off call, will deteriorate the average quality of all calls in the system as a whole, because mobiles will then be handled by more remote base stations on the average. Any mobile may experience an alarm case and be handed off to a channel in another cell whereby the deterioration caused to the overall system quality depends on the location of the mobile which in its turn determines the transmission power level of the mobile station required on the new channel.

The GSM specification allows alarm case handoff for any mobile station having a bad quality connection as defined by a highest allowed bit error rate. If a mobile station experiences a bit error rate beyond this allowed bit error rate, the mobile station may be handed off to another base station in an attempt to keep the connection going. In the GSM system, if an alarm case occurs then the list of preferred cells is compiled. The list is compiled in a decreasing order of priority and when an alarm case occurs, the system attempts to hand off the mobile station to the next best preferred cell. However, simulations have shown that alarm case intercell, i.e., from one cell to another, handoff according to the GSM system may cause system instability. In other words, high traffic may cause high bit error rates which causes more and more mobiles to be handed off to more distant base stations which in turn increases the bit error rates, until the system breakes down.

SUMMARY OF THE DISCLOSURE

It is an object of the present invention to provide a handoff method which allows a mobile station to be handed off from one base station to another base station when an alarm case occurs in an operator controlled manner in an attempt to save the connection.

In a cellular mobile radio telephone system having a plurality of cells providing radio coverage by a plurality of base stations and having a plurality of mobile stations associated with the cells, the system first defines a cell border where a handoff is allowed from a first base station to a second base station by comparing the radio transmissions between a mobile station and the first and second base stations. The system then moves the handoff border by an offset value to form an alarm case cell border, wherein an alarm case handoff from the first base station to the second base station is allowed only when the mobile station experiences an alarm case and is in the area bounded by the handoff cell border and the alarm case handoff border. In one embodiment, the nominal cell border between two cells is located where the difference in signal strength between downlink (or uplink) signals of the two base stations is equal to a first predetermined value s dB's, which is a cell border adjustment factor, which in many cases is zero. The handoff cell border from the first base station to the second base station is located a second predetermined value n dB's away from the nominal cell border. The boundary of the alarm case, i.e., the alarm case handoff border, is obtained by applying an offset of a third predetermined value c dB's to the handoff cell border from the first base station to the second base station.

In another embodiment of the present invention, a cellular mobile radio telephone system is disclosed having a plurality of cells each providing radio coverage by a base station and having a plurality of mobile stations associated with the cells first defines an alarm case handoff border. Then, the system hands off a mobile station from a first base station to a second base station when the mobile station experiences an alarm case and is beyond the alarm case handoff border.

In another embodiment of the present invention, the same principles as described above for handoff is applied to directed retry which is a function well known in the art. Directed retry is an order given by a cell to an accessing mobile station when the cell does not have any more traffic channels to assign. This order refuses access to the mobile station but suggests specific neighboring radio base stations that may be accessed by the mobile station instead. According to one embodiment of the present invention, a directed retry order is given to mobile stations when the accessed cell is congested and when the accessing mobile station is beyond a directed retry border. The directed retry border for directed retry from a first base station to a second base station is located a third predetermined value m dB's away from the nominal cell border described above.

One merit of the present invention is to allow the system operator to avoid system instability by controlling the extent of alarm case handoffs. Another merit of the present invention is a better definition of cell periphery regions for alarm case handoff caused by bad quality transmission or for directed retry and handoffs caused by congestion in the cell wherein better definition means relating the borders of the periphery regions to a nominal cell border between two cells rather than to signal strength limits between a mobile and the base station serving the mobile. Thus, it is possible to change nominal cell borders only, without redefining peripheral regions, because these relate automatically to any changed borders.

BRIEF DESCRIPTION OF THE DRAWINGS

These and other features and advantages of the invention will be readily apparent to one of ordinary skill in the art from the following written description, used in conjunction with the drawings, in which.

DETAILED DESCRIPTION OF THE PREFERRED EMBODIMENTS

According to one embodiment of the present invention, the present invention makes it possible to control a handoff initiated by an alarm case scenario. If an alarm case occurs, a modified locating algorithm is used in evaluating if a handoff should be performed.

First, an algorithm is used to determine which cell a mobile station belongs to. The algorithm is called the "locating" algorithm. The locating algorithm uses data measured by the mobile station or the base station. The measured data can, for example, be of the following types: received signal strength from own base station measured by the mobile station; the received signal strength from the mobile station measured by the base station; the signal strength from surrounding base stations measured by the mobile station; and the estimated bit error rate (BER) of own link. It will be obvious to one of ordinary skill in the art that the data used by the locating algorithm is not limited to the data listed above, but may include, for example, the actual transmitting power of the mobile station, mobile velocity, time, etc. In addition, the locating algorithm can have several cell dependent constants including base station transmitting power and hysteresis. A "normal", i.e., a non-alarm case, locating algorithm is illustrated below:

$$SS_{OWN} + HYST \begin{array}{c} CHOSE_{N1} \\ < \\ \geq \\ CHOSE_{OWN} \end{array} SS_{N1}$$

where $SS_{OWN}$=signal strength on own up or down link; HYST=hysteresis towards neighboring cell; and $SS_{N1}$= signal strength between mobile station and neighboring cell N1. The above formula is used as follows. If the left hand expression is equal to or larger than the right hand variable, the mobile station is still within its "own" cell as indicated by the text "chose own". If the left hand expression is smaller than the right hand variable, the mobile station has entered the cell N1 and the handoff may be performed as indicated by the text "chose N1".

Figure 1:
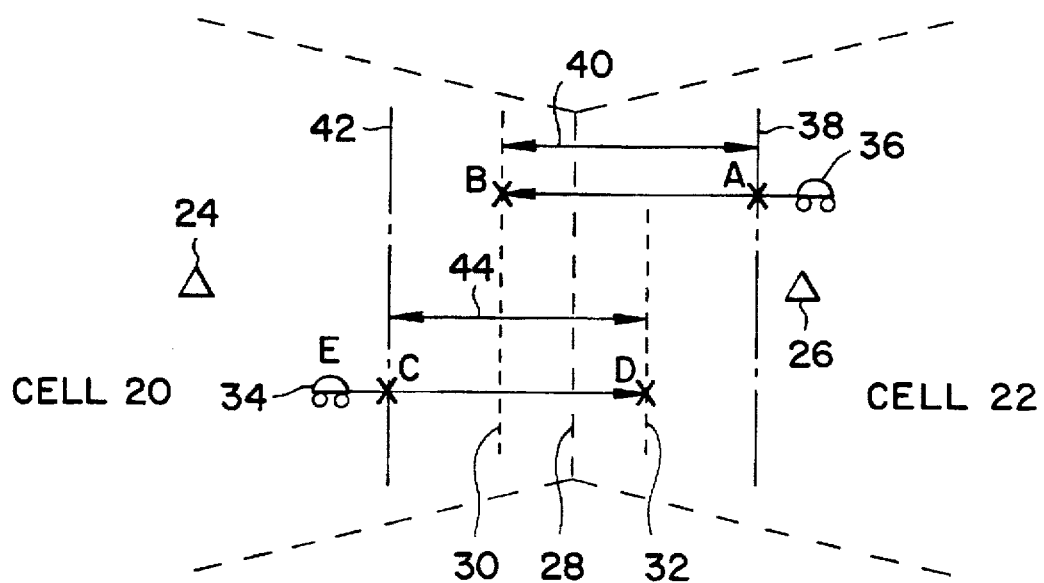
FIG. 1 illustrates a cell structure according to one embodiment of the present invention.

Referring now to FIG. 1, two cells, cell 20 and cell 22, each have a base station 24 and 26, respectively. A nominal cell border 28 located between the two cells can therefore be defined as the points where the difference in signal strength of downlink or uplink signals from the base stations 24 and 26 is equal to a first predetermined number s dB's. In another embodiment of the present invention, path loss can be used instead of signal strength so that the nominal cell boundary can be defined as the points where instead the difference in path loss between two cells is equal to the first predetermined number s dB's. These processes are described in detail in U.S. application Ser. No. 07/790,170 entitled "Radiotelephone Locating and Handoff Using Alternative Criteria" which is commonly assigned and is incorporated herein by reference.

In the embodiment relating to FIG. 1, the non alarm case locating algorithm becomes:

$$SS_{OWN} + HYST = SS_{N1} + s \ dB's$$

where $SS_{OWN}$=signal strength on own link;
HYST=hysteresis towards neighboring cell;
$SS_{N1}$=signal strength between mobile station and neighboring cell N1; and
s dB's=cell border adjustment factor.

Without a hysteresis feature, when a mobile station 34 crosses the nominal cell border 28, the mobile station would be handed off from cell 20 to cell 22. However, in order to avoid oscillating handoffs, it is desirous not to handoff a mobile station as soon as it crosses the cell border 28. As a result, a predetermined hysteresis value n dB's is added to the signal strength received by the mobile station from the base station 24 which in essence moves the cell border 28 toward the cell 22 and creates a handoff cell border 32. As a result, the mobile station 34 is not handed off from base station 24 to base station 26 until the mobile station 34 crosses the handoff cell border 32 at point D illustrated in FIG. 1. When the mobile station 34 crosses the handoff cell border 32, the mobile station is handed off from base station 24 to base station 26 in a manner that is well known in the art. The hysteresis value is a constant that the cell operator can define. Usually, the default value for hysteresis is set at 3-4 decibels.

In the present invention, when an alarm case occurs, a modified locating algorithm is used to determine if a handoff should be performed. An offset value c dB's which is negative is added to the signal strength received by the mobile station. The modified algorithm is illustrated below:

$$SS_{OWN} + HYST + OFFSET = SS_{N1} + s \ dB's$$

where $SS_{OWN}$=signal strength on own link;
HYST=hysteresis toward neighboring cell;
OFFSET=the negative offset value;
$SS_{N1}$=signal strength between the mobile station and the neighboring cell N1; and
s dB's=cell border adjustment factor.

As illustrated in FIG. 1, the alarm case cell border 42 is formed by shifting the handoff cell border 32 by the amount of the offset value c dB's. As a result, an alarm case corridor 44 is formed between alarm case cell border 42 and handoff cell border 32 wherein a handoff may be performed if a mobile station experiences an alarm case while in the alarm case corridor. For example, if the mobile station 34 located at point C in FIG. 1, experiences an alarm case, i.e., has passed a low quality limit and intra-cell handoff is not possible, the mobile station 34 is handed off from the base station 24 to the base station 26 since the mobile station is within the alarm case corridor 44. However, if the mobile station 34 which is currently operating on a channel from base station 24 is located at point E in FIG. 1, the mobile station 34 is not handed off to a different base station if the mobile station 34 experiences an alarm case but rather may be handed off to a different less disturbed channel within the same base station 24 or may be disconnected. In the present invention, when an alarm handoff occurs, the land system ordering the handoff thereby knows that the particular mobile station has experienced an alarm case. As a result, the new cell will keep the mobile for at least a predetermined period of time before attempting to find a better cell.

For a better understanding of the present invention, FIG. 1 also illustrates the situation where a mobile station 36 moves from the cell 22 with a radio base station 26 to the cell 20 with a radio base station 24. The same description as provided above may be given for the occurance of normal handoff and alarm case handoff respectively, whereby the following correspondances apply:

| mobile station | 34 | 36 |
| --- | --- | --- |
| normal handoff cell border | 32(D) | 30(B) |
| alarm case handoff border | 42(C) | 38(A) |
| alarm case corridor | 44 | 40 |

In another embodiment of the present invention, another emergency scenario could occur during a call setup routine if the presently used cell does not have any available channels to handle the new call. When this situation occurs, the call can either be ignored by the cell, wherein the call is disconnected, or the call can be directed to another cell which is termed directed retry. However, if the call is setup in the next best cell, the call may cause unwanted interference with other calls. As a result, it is desirable to place limits on when a call can or should be setup in a next best cell. According to one embodiment of the present invention, only mobile stations within a defined emergency corridor are eligible to be redirected to a next best cell when a channel is not available in the cell in which the mobile station is located. With reference to FIG. 1, if the mobile station 34 is at the point E and wishes to make a call but a channel is not available in cell 20, the mobile station 34 should be disconnected because of congestion. However, if the mobile station is located at point C, the mobile station can be redirected to cell 22, i.e., the next best cell, since the mobile station 34 is within the emergency corridor 44.

Figure 2:
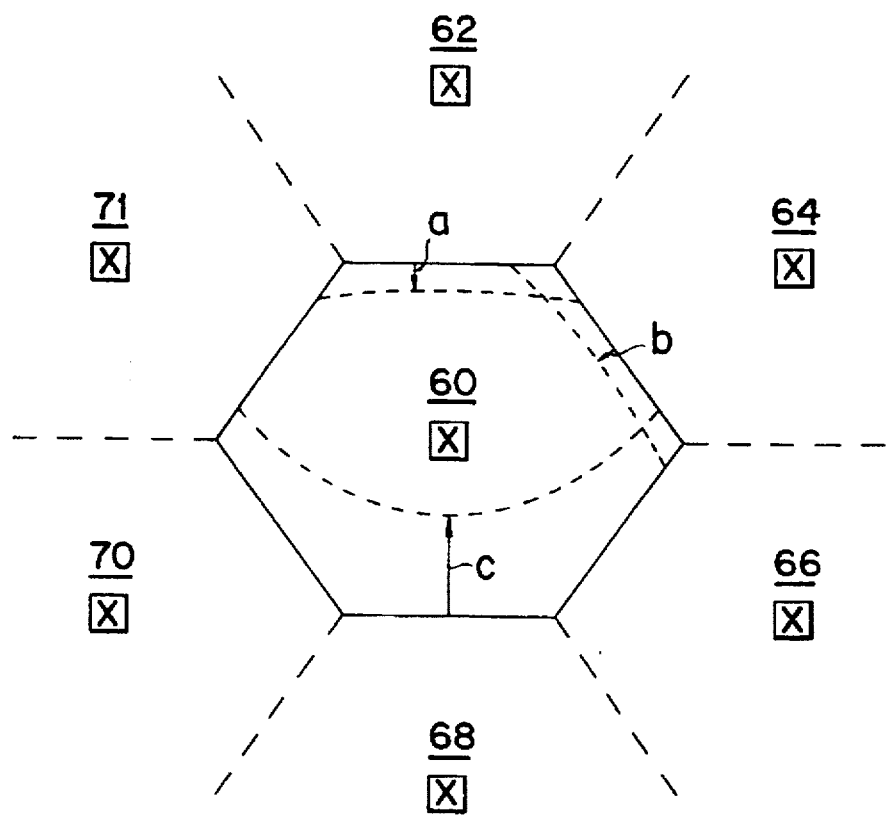
FIG. 2 illustrates an original cell with six neighboring cells according to one embodiment of the present invention.

The offset parameter can be set at different values for directed retry and will normally differ from offset values used for alarm case handoff. As illustrated in FIG. 2, the directed retry offset value from the nominal cell border can be set at "A" for the cell border between cell 60 and cell 62 while the offset can be set to "B" for the border between cell 60 and cell 64 and the offset can be set to "C" between cell 60 and cells 66, 68, and 70. Alternatively, the offset from the nominal cell border can be set equal to 0 as between cells 60 and 71. This allows the system operator to design the cellular mobile system according to the carrier-to-interference level for each cell-to-cell relationship.

Figure 3:
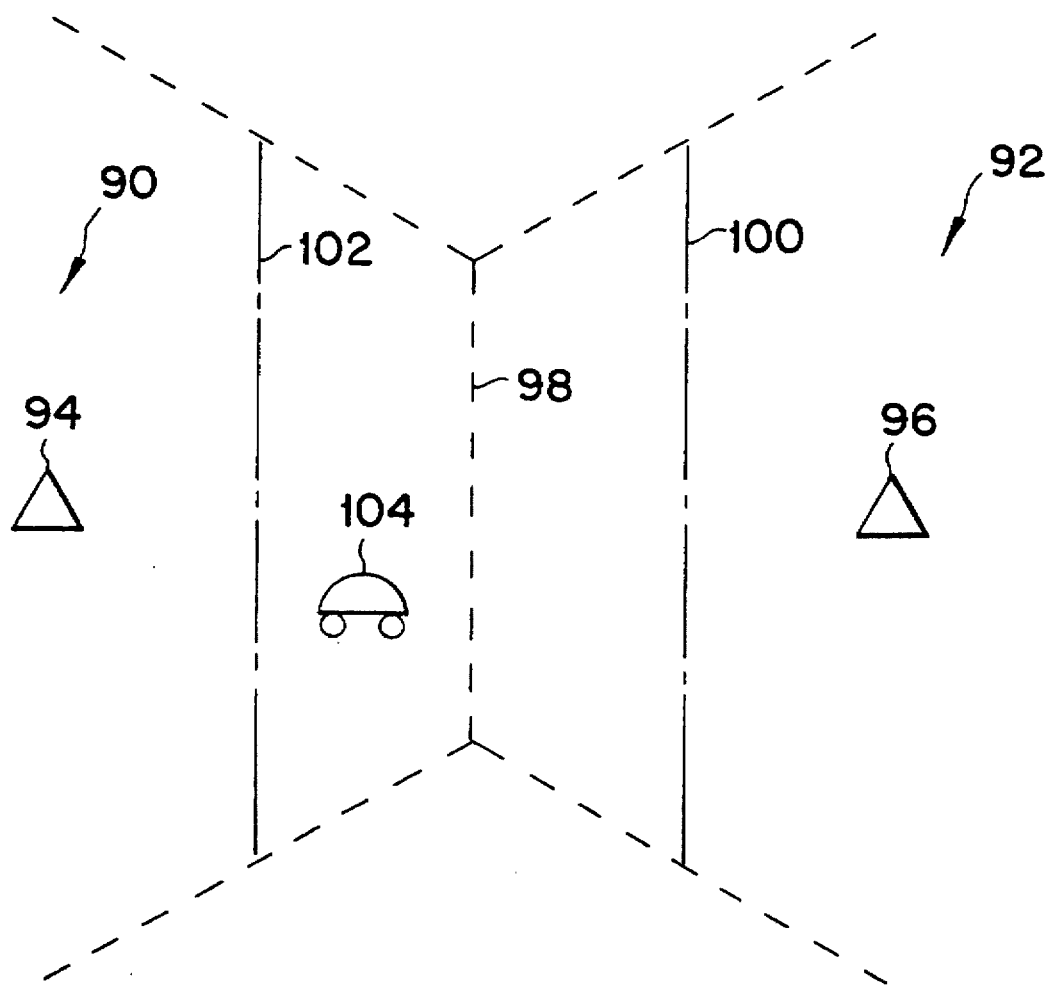
FIG. 3 illustrates a directed retry border according to another embodiment of the present invention.

This embodiment is illustrated in FIG. 3. In FIG. 3, a first cell 90 has a base station 94 and second cell 92 has a base station 96. A nominal cell border 98 separates the two cells 90 and 92. According to this embodiment, a directed retry border 102 is formed for cell 90 a third predetermined value $m_1$ dB's away from the nominal cell border 98. Likewise, a directed retry border 100 is formed for cell 92 the third predetermined value $m_2$ dB's away from the nominal cell border 98. Therefore, if a mobile station 104 attempts to access base station 94 when the base station 94 does not have any available traffic channels to assign, the base station 94 can send a directed retry order to the mobile station 104 since the mobile station is beyond the directed retry border 102.

It will be appreciated by those of ordinary skill in the art that the present invention can be embodied in other specific forms without departing from the spirit of essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method for handoff in an alarm case in a cellular mobile radio telephone system having a plurality of cells each providing radio coverage by a base station and having a plurality of mobile stations associated with said cells, said method comprising the steps of:
    defining a handoff cell border where the handoff is allowed from a first base station to a second base station by comparing radio transmissions between a mobile station and said first and second base stations;
    modifying said handoff border by the offset value to form an alarm case handoff border, wherein the alarm case handoff is allowed only when said mobile station experiences the alarm case and is in an area bounded by said handoff cell border and said alarm case handoff border.

2. A method for handoff in an alarm case according to claim 1, wherein said handoff cell border is located where signal strength of the first base station plus a hysteresis value equals the signal strength of said second base station.

3. A method for handoff in an alarm case according to claim 2, wherein said hysteresis value is set between three and four decibels.

4. A method for handoff in an alarm case according to claim 1, wherein said alarm case handoff border is located where signal strength of said first base station plus a hysteresis value minus an offset value equals the signal strength of said second base station plus a first predetermined value.

5. A method for handoff in an alarm case according to claim 4, wherein said offset value is a negative value.

6. A method for handoff in an alarm case according to claim 4, wherein said hysteresis value is set between 3 and 4 decibels.

7. A method for handoff in an alarm case according to claim 1, wherein said alarm case occurs when a bit error rate of a signal between the mobile station and the first base station exceeds a second predetermined level.

8. A method for directed retry in a cellular mobile radio telephone system having a plurality of cells each providing radio coverage by a base station and having a plurality of mobile stations associated with said cells, said method comprising the steps of:

defining a nominal cell border by comparing the radio transmissions between a mobile station and first and second base stations;

modifying said nominal border by an offset value to form a directed retry border, wherein the directed retry is allowed only when said mobile station attempts to access said first base station and said first base station does not have an available traffic channel and the mobile station is located beyond said directed retry border.

* * * * *